Patented Nov. 24, 1936

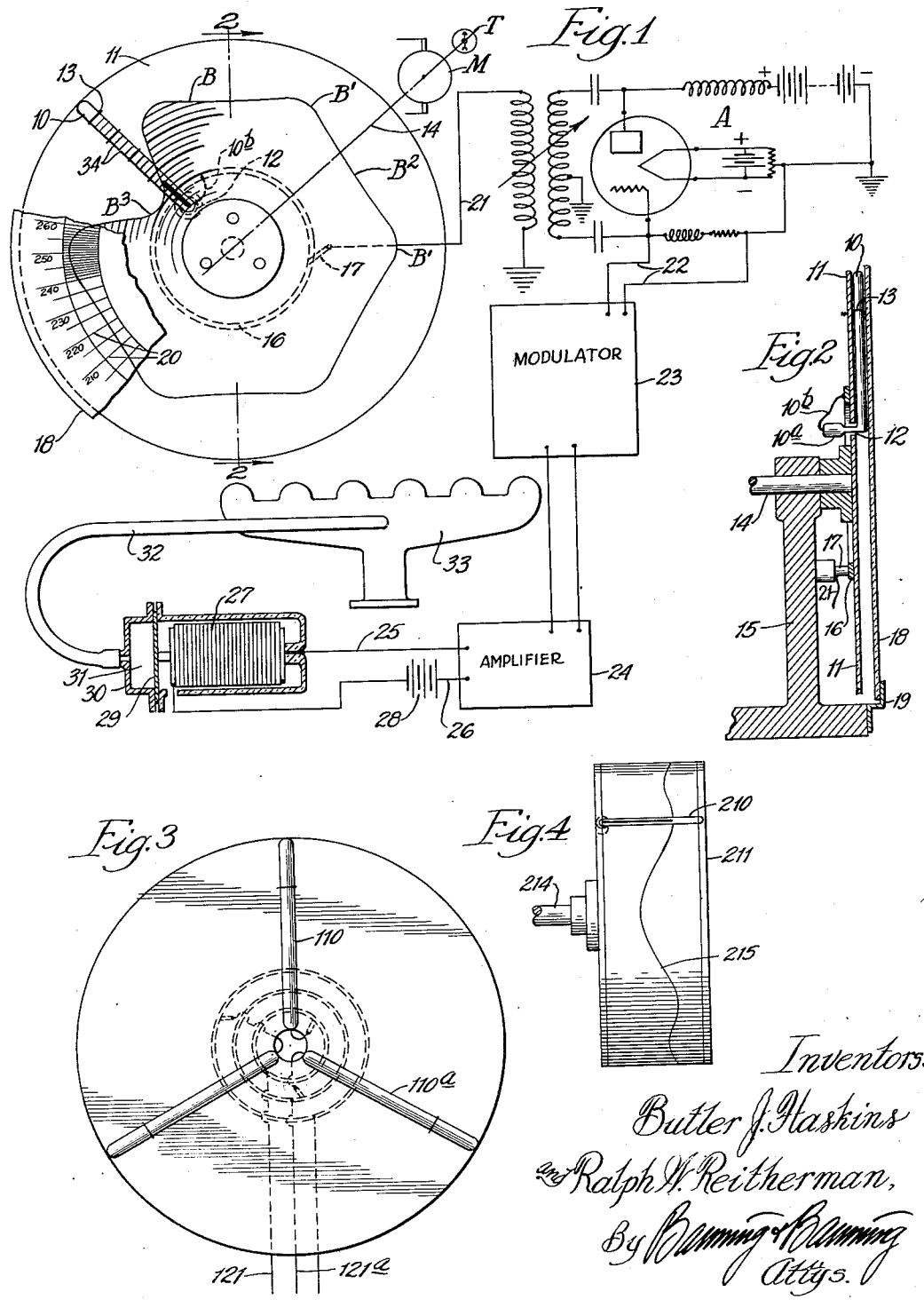

2,062,174

UNITED STATES PATENT OFFICE 2,062,174

ELECTRON DISCHARGE OSCILLOGRAPH

Butler J. Haskins and Ralph W. Reitherman, Chicago, Ill., assignors to Joseph Weidenhoff, Inc., Chicago, Ill., a corporation of Illinois Application March 14, 1935, Serial No. 11,097

11 Claims. (Cl. 171—95)

An object of this invention is to provide an improved form of oscillograph and particularly one using a rotating electron discharge tube for indicating various phenomena, such as the strength of an electrical impulse, an electrical potential, or the like, at a given instant, the electron discharge tube being lighted from one end, the length of the lighted portion of the tube varying according to changes in the potential and current applied thereto.

This and other objects, as will hereinafter appear, are accomplished by this invention which is fully described in the following specification and shown in the accompanying drawing, in which—

Figure 1 is a partial front elevation of a device embodying the invention, showing diagrammatically the circuit for lighting the electron discharge tube;

Fig. 2 is a partial section on the line 2—2 of Fig. 1; and

Figs. 3 and 4 are modified forms of the device.

The embodiment shown in Fig. 1 comprises a neon or other electron discharge tube 10 mounted preferably radially on a suitable dark opaque insulator, such as a disk 11 of bakelite, or the like. This tube is made L-shaped and passes through a hole 12 in the disk and is secured to the face of the disk, preferably by one or more wires 13. The disk 11 is mounted on a shaft 14 suitably journaled in a frame 15 and driven by means of a variable speed electric motor, and having a tachometer T to indicate its speed of rotation. The tube 10 is provided at the inner end 10a with a suitable electrode which connects through a lead 10b with a slip ring 16 which is secured to the back of the disk concentrically with the shaft 14. A brush 17 carried by the frame bears upon the ring so as to make electrical contact therewith. A glass plate or the like 18 is secured to the frame by means of brackets or clips 19 (Fig. 2), and carries a series of graduations 20 which radiate from the center of the shaft 14, and which are graduated in degrees for a purpose which will later be described.

The brush 17 connects through a lead 21 with a suitable high frequency oscillator A which in turn connects through two leads 22 with a modulator 23, and this through an amplifier 24, these two amplifying and modulating electric impulses which are received from leads 25, 26, and which it is desired shall be examined. In this instance, the lead 25 connects to one end of a carbon pile 27, while the lead 26 connects to the opposite end of the carbon pile through a battery 28. Pressure on the carbon pile is varied by a diaphragm 29 secured at its edges under a hood 30 which together with the diaphragm forms a chamber 31, which connects through a tube 32 with an intake manifold 33 of an internal combustion engine. It will be understood, of course, that this embodiment is only by way of illustration as the electric impulses supplied by the leads 25, 26 and which are to be examined may be generated in numerous other ways, as will later be explained.

Thus the oscillator generates a radio frequency carrier wave which is modulated by electrical impulses received through the leads 22, the potential of the modulated wave being adjusted so as to light a portion only of the tube 10 so that variations in the electrical impulses are rendered visible by the rotating tube.

Thus in the form shown in Fig. 1, variations in pressure within the manifold while the internal combustion engine to which it is connected is in operation, cause the diaphragm 28 to move in and out, thereby varying pressure on the carbon pile 27 and thus producing variations in the electrical impulses supplied to the amplifier through the leads 25, 26. These electric impulses are greatly amplified by the amplifier, by the modulator, and by the oscillator A, with the result that when they reach the electron discharge tube 10 they cause it to be illuminated from one end as set forth in detail in a co-pending application Serial No. 751,560, filed November 4, 1934, (Div. 54), varying in accordance with the voltage applied thereto. As long as this tube is held stationary, these variations in length of the illuminated portion would be noticeable, if at all, merely by the slight flickering of the outer end of the illuminated portion. When the tube is rapidly rotated, however, by the shaft 14, these variations in the length of the lighted portion of the tube become very noticeable and are observed to follow a definite pattern. In the apparatus shown, they indicate the degree of vacuum in the intake manifold, as well as the fluctuations in vacuum.

It is now necessary to synchronize the rotation of the shaft 14 with the distributor shaft of the engine—that is, the shaft 14 should preferably run at one-half the engine speed or at some multiple of that speed. When this is done, it will be seen that the illuminated portion of the neon tube described a figure which may resemble that formed by the line B of Fig. 1 which has humps B' representing maximum vacuum, and depressions B² therebetween representing somewhat lower vacuum. Should the valves in one of the engine cylinders be working improperly this line might take the form B³ where the vacuum suddenly sinks to a low level.

The degree of vacuum may be measured by the height of the illuminated portion as measured radially outwardly from the disk. To assist in this measurement the tube 10 may be provided with a series of graduations 34, and one or more retaining wires 13 may, if desired, be so spaced as to serve for such graduations. When the tube is lighted and whirled the graduations 13, 34 produce dark bands which are very sharply marked and which serve to indicate at any point the distance to which the tube is illuminated.

At the same time the annular graduations 20 on the stationary plate 18 serve to locate the angular position of the tube at any desired point on the line B. It will be understood, of course, that for this particular purpose the shaft 14 may, if desired, be connected in any suitable manner to one of the engine shafts, as, for example, is shown by the reissue patent to Haskins No. 18,596.

It will also be understood that this device may be used for measuring potentials either constant or varying, whether direct current or alternating current for measuring current strengths either constant, varying or alternating, and for measuring all sorts of physical phenomena where those phenomena can be transformed into an electrical impulse.

The superposed electric impulse may have any desired frequency within quite a broad range which may be rendered visible on the rotating disk. With the disk in rotation, the electrical impulse to be measured or examined is applied to the lead 22. A wavy line outlining a lighted central area will thus be generated, the form of which will depend partly on the frequency of the applied impulse and partly on the speed of rotation of the disk 11. By carefully adjusting the speed of the motor M, the number of impulses per revolution can be increased or decreased. When an even number of impulses is received for each revolution of the disk, the waves shown in one revolution fall in the same relative position as those of succeeding revolutions and so become superposed and the lighted area thus assumes a bright, clearly outlined pattern and the disk is in synchronism with the applied impulse. When not in synchronism the peaks and troughs of the waves fall at different points on different revolutions and present a very jumbled appearance due to the persistence of vision of the differently shaped areas. By speeding the motor up or down, synchronism may be obtained at different speeds and with different numbers of peaks appearing, while the frequency of the applied impulse is constant. Where a constant potential is applied, the bright area formed is a circle.

In Fig. 3 is shown a modified form of the disk on which are mounted a plurality of tubes 110, 110ª, etc., each of which is supplied by a separate wire 121, 121ª, etc., each preferably from a separate oscillator, such as shown in Fig. 1. Each oscillator may be separately excited by its own electric impulse independently of the others. By filling these tubes with different gases, different colors may be obtained, so that a plurality of electric impulses can be simultaneously examined by the same disk and relations between the several impulses examined.

In Fig. 4 is shown another modification of the invention in which an electron discharge tube 210 is mounted longitudinally on the outside of a rotating drum 211 of bakelite or the like. The tube 210 is connected to an oscillator as previously described, so that with the drum 211 in rotation on its shaft 214 the upper margin of the lighted band may follow a wavy line as 215. Thus if an alternating current of the proper potential is applied to the leads 22, the wave line 215 will be substantially a half sine wave. If now a similar tube is set back to back with the tube 210 and a similar wave of opposite polarity applied thereto, the line 215 may be substantially a complete continuous full sine wave.

In the form shown in Fig. 4, the tube may carry its own graduations as before, or the longitudinal graduation as well as angular graduations may be carried on a transparent sheet surrounding the tube, or the tube may be self-supporting and move over such a graduated scale. This may be applied also to the rotating tube 10 of Fig. 1. By placing the longitudinal graduations directly on the tube they largely avoid the parallax which might occur due to placing this scale at a distance from the tube, and result in sharp line graduations as the tube is rotated.

Still another modification of the invention might be had by mounting the neon or other gaseous discharge tube on a narrow strip and rotating that, as previously described, in front of a dark background. This tube could be provided with graduations like the graduations 13, 34 of Fig. 1, and this tube could be provided with a plate 18 graduated in terms of degrees of arc, as shown in Fig. 1. It will also be apparent that the latter device could be rotated in front of the disk 11 and could be driven at the same speed or at a different speed from the disk 11 and in the same or in opposite directions.

It will also be plain that any of the foregoing devices can be utilized to obtain very brilliant lighting effects for display purposes, particularly where a plurality of tubes is used, each tube producing a different colored light, and each tube energized to produce a different wave band.

We claim:

1. In a device of the class described, an inert gas discharge tube filled only with an inert gas and having an electrode only at one end, means for lighting the tube by radio frequency electrical oscillations for varying lengths from one end depending upon variations in the impressed potential, and means for rotating the tube about a fixed axis.

2. In a device of the class described, an inert gas discharge tube filled only with an inert gas and having an electrode only at one end, means for lighting the tube by radio frequency electrical oscillations for varying lengths from one end depending upon variations in the impressed potential, means for rotating the tube about a fixed axis, and a dark background for the lighted tube.

3. In a device of the class described, an inert gas discharge tube filled only with an inert gas and having an electrode only at one end, means for lighting the tube by radio frequency electrical oscillations for varying lengths from one end depending upon variations in the impressed potential, means for rotating the tube about a fixed axis, and a graduated scale in front of the tube for reading the lighted portions of the tube at different angular positions.

4. In a device of the class described, an inert gas discharge tube filled only with an inert gas and having an electrode only at one end, means for lighting the tube by radio frequency electrical oscillations for varying lengths from one end depending upon variations in the impressed potential, and means for rotating the tube about a fixed axis while the tube is substantially parallel thereto.

5. In a device of the class described, an inert gas discharge tube filled only with an inert gas and having an electrode only at one end, an oscillator for exciting the tube by radio frequency carrier wave oscillations, means for superposing on the carrier wave an electrical impulse which is to be examined, and means for rotating the neon tube about a fixed axis outside of the tube, the excitation of the tube being sufficient to light a part only of the tube whereby variations in the superposed impulse cause the lighted portion of the tube to vary in length.

6. In a device of the class described, an inert gas discharge tube filled only with an inert gas and having an electrode only at one end, an oscillator for exciting the tube by radio frequency carrier wave oscillations, means for superposing on the carrier wave an electrical impulse which is to be examined, means for rotating the neon tube about a fixed axis outside of the tube, the excitation of the tube being sufficient to light a part only of the tube whereby variations in the superposed impulse cause the lighted portion of the tube to vary in length, and a scale carried by the disc and graduated radially.

7. In a device of the class described, an inert gas discharge tube filled only with an inert gas and having an electrode only at one end, an oscillator for exciting the tube by radio frequency carrier wave oscillations, means for superposing on the carrier wave an electrical impulse which is to be examined, means for rotating the neon tube about a fixed axis outside of the tube, the excitation of the tube being sufficient to light a part only of the tube whereby variations in the superposed impulse cause the lighted portion of the tube to vary in length, and a scale graduated longitudinally of the tube and rotatable therewith.

8. In a device of the class described, a neon tube, an oscillator for exciting the tube by radio frequency carrier wave oscillations, means for superposing on the carrier wave an electrical impulse which is to be examined, means for rotating the neon tube about a fixed axis outside of the tube, the excitation of the tube being sufficient to light a part only of the tube whereby variations in the superposed impulse cause the lighted portion of the tube to vary in length, a scale graduated longitudinally of the tube, and a second scale graduated in degrees of arc about the axis of rotation.

9. The method of visually examining an electrical impulse comprising energizing a gaseous discharge tube filled only with an inert gas and having an electrode only at one end so as to partially light it from one end by a high frequency carrier wave, modulating the carrier wave by electrical impulse to be examined, and moving the tube laterally to produce a band of light, one edge of which varies with variations in the electrical impulse.

10. The method of visually examining an electrical impulse comprising energizing a gaseous discharge tube filled only with an inert gas and having an electrode only at one end so as to partially light it from one end by a high frequency carrier wave, modulating the carrier wave by electrical impulse to be examined, and rotating the tube about a fixed axis to produce a band of light, one edge of which varies with variations in the electrical impulse.

11. In a device of the class described, an inert gas discharge tube filled only with an inert gas and having an electrode only at one end, means for lighting the tube for a part only of its length by radio frequency carrier wave oscillations, modulating means for modulating an electrical impulse and superposing it on the carrier wave, and means for rotating said tube about a fixed axis in synchronism with the modulated impulses.

BUTLER J. HASKINS.
RALPH W. REITHERMAN.